United States Patent
Cormican

(10) Patent No.: US 6,331,008 B2
(45) Date of Patent: *Dec. 18, 2001

(54) ONE PIECE MOLDED SKI APPARATUS

(76) Inventor: Dale DeWayne Cormican, Rte. 1, Box 153, Mentor, MN (US) 56736

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,892

(22) Filed: Aug. 7, 1998

(51) Int. Cl.[7] .............................. A63C 5/07; A63C 11/00; B62M 27/02
(52) U.S. Cl. .............................. 280/22; 280/809; 180/182
(58) Field of Search .............................. 280/14.1, 22, 28, 280/15, 16, 17, 22.1, 809, 21.1; 180/182, 190

(56) References Cited

U.S. PATENT DOCUMENTS

| | | | |
|---|---|---|---|
| D. 183,230 | 7/1958 | Johnson | D71/1 |
| D. 366,014 | 1/1996 | Lindquist et al. | D12/7 |
| 393,493 * | 2/1888 | Wheeler | 280/15 |
| 1,108,160 * | 8/1914 | Simley | 280/28 |
| 3,123,373 | 3/1964 | Antcliff | 280/12 |
| 3,482,849 * | 12/1969 | Puetz | 280/28 |
| 3,643,978 | 2/1972 | Westberg | 280/28 |
| 3,711,108 * | 1/1973 | Orozco et al. | 280/21 |
| 3,765,695 | 10/1973 | McGregor | 280/28 |
| 3,782,745 | 1/1974 | Stoveken | 280/18 |
| 3,817,544 * | 6/1974 | Labelle | 280/28 |
| 3,897,839 * | 8/1975 | Brisebois | 280/28 |
| 4,108,453 * | 8/1978 | Lavalier | 280/28 |
| 4,491,333 * | 1/1985 | Warnke | 280/28 |
| 5,040,818 | 8/1991 | Metheny | 280/609 |
| 5,135,249 | 8/1992 | Morris | 280/609 |
| 5,145,195 | 9/1992 | Campbell et al. | 280/28 |
| 5,145,201 | 9/1992 | Metheny | 280/609 |
| 5,165,709 * | 11/1992 | Jacques | 280/28 |
| 5,222,749 | 6/1993 | Bergstrom | 280/28 |
| 5,284,357 | 2/1994 | Tinkler | 280/602 |
| 5,344,168 | 9/1994 | Olson et al. | 280/28 |
| 5,360,220 | 11/1994 | Simmons | 280/28 |
| 5,443,278 * | 8/1995 | Berto | 280/28 |
| 5,599,030 | 2/1997 | Campbell et al. | 280/28 |
| 5,700,020 | 12/1997 | Noble | 280/28 |
| 6,012,728 * | 1/2000 | Noble | 280/28 |
| 6,102,413 * | 8/2000 | Khennache et al. | 280/28 |

* cited by examiner

Primary Examiner—Lanna Mai
Assistant Examiner—Hau Phan
(74) Attorney, Agent, or Firm—Michael S. Neustel

(57) ABSTRACT

A flexible ski which is molded in one piece entirely of Ultra High Molecular Weight Polyethylene plastic. The adjustable flex ski is made up of a ski body which forms the majority of the invention and provides the base from which the other components are formed. This ski body is molded in a flat configuration. The front portion of this ski is given a pre-load function by bending the forward most portion of the ski body in an upward fashion. It is then held in this position by the use of pre-load bar which extends pivotally rearward from the tip of the ski to a ski saddle located on the upper center surface of the ski body. This saddle provides various attachment points for the pre-load bar and can thus, vary the amount of pre-load on ski. The saddle is also supplied with an attachment point for mounting the ski on the vehicle. This configuration allows the tip of the adjustable flex ski to flex in an upwardly fashion when confronting obstacles which provides the operator with a greater degree of control in rough terrain.

3 Claims, 7 Drawing Sheets

ONE PIECE MOLDED SKI APPARATUS

BACKGROUND OF THE INVENTION

The present invention relates to an improvement in skis used on snowmobiles or other vehicles to facilitate forward movement and steering. More specifically, to a ski which is constructed entirely from Ultra High Molecular Weight Polyethylene (UHMW), as one piece including the attachment saddle which facilitates the attachment of a ski to the front end of a typical snowmobile.

Typical snowmobiles are powered by a front mounted engine attached to a rear endless track system. The track on conventional snowmobiles is suspended using springs and gas powered shocks to absorb bumps and aid in control and handling of the snowmobile. These snowmobiles are typically supplied with two skis attached to a rider operated steering system. The skis are placed in front of the track system and are, thus, the first part of the vehicle to meet obstacles such as rocks, logs and bumps. Different manufacturers have developed and utilized several different means of adding travel to each individual ski system. These systems range from a wishbone type suspension to an upright spring and dampener type system.

The classic, or conventional, snowmobile ski is constructed of metal and attaches to the steering system mechanism at a point near the middle of the ski. These skis are typically curved upward at the forward portion which allows the ski to ride over obstacles. The curved portion also aids the ski in traveling through snow conditions ranging from deep powder snow to slush and ice.

A stiff loop, made of metal rods, is typically attached to the front portion of the ski near the top of the front curved section. Some skis have used a piece of angle iron or bracketing to increase the strength of the loop. This rod or loop is then attached in a circular fashion back towards the center portion of the ski. The loops have several purposes the first of which is to strengthen the ski. The loops also act as a continuation of the curved portion of the ski and, thus, enhances the skis ability to handle bumps, moguls or obstacles. These loops have also evolved into handles to aid moving the snowmobile or picking up the front for a variety of reasons.

The metal ski has been standard for many years, but recently the industry has begun adopting skis made of metal bridges, reinforcements and plastic portions. This plastic may be of a type such as a Ultra High Molecular Weight Polyethylene (UHMW) or (UHMW-PE) plastic. This type of ski has been developed to overcome some of the disadvantages of the metal ski. One of these disadvantages has been that metal skis are unyielding and thus, subject to dents and bends as the ski is used in normal operation. These bends and dents eventually lead to a drop in performance of the ski and often necessitate the replacement of the ski. The use of flexible and resilient plastics has resulted in skis that are durable and able to withstand impacts that would have damaged conventional metal skis. These skis, however, are made with metal bridges, saddles or supports that result in a ski resilient at its edges, and is overall rigid. The problem with a ski that is overall rigid is that when the tip of the ski encounters a bump or obstacle the ski will follow this bump or move this results in the base of the ski losing contact with the ground or snow which substantially affects the rider's ability to control the vehicle as it will tend to dart from side to side as the ski loses contact with the ground.

U.S. Pat. No. 5,040,818 issued to Metheny on Aug. 20, 1991 and U.S. Pat. No. 5,145,201 issued to Metheny on Sep. 8, 1992, a continuation in part issuing from the 818 patent generally discloses one of the current plastic and metal skis. This ski has a formed plastic base with a metal bridge and saddle top. The front tip of the ski in one embodiment is equipped with a solid loop and upper bridge which holds the front of the ski in a curved and rigid form. In this embodiment the ski is substantially rigid and thus, suffers from the same handling characteristics as the metal ski in bumps. A second embodiment of this ski uses a rigid rod of adjustable length which may used to vary the upward curvature of the ski as the rod is lengthened or shortened. This embodiment has some flexibility however, the flex tends to be behind the rod's connection point and in front of the metal saddle at one point on top of the ski. This tendency to flex at one point, as the rod is solid, results in a ski that flexes too much to the point that it is damaged or broken by severe impacts such as logs or rocks, and thus, can create a dangerous situation for the rider.

Another ski of the plastic variety is shown in U.S. Pat. No. 5,360,220 issued to Simmons on Nov. 1, 1994. This patent discloses a ski having a plastic curved base. The base has a flexible loop attached to the underside of the front and up and over the tip of the ski to a point on the upper base of the ski near the middle. The loop is attached near the middle of the ski in a slidable fashion such that the ski may flex. This configuration works to make the ski somewhat flexible, however, as the ski is pre-curved the flex is not adjustable. The loop acts to evenly distribute the bending and flexing of the ski over a large area. Although, this works to alleviate the problems of flex in one point, and thus, prevents breakage this design is not adjustable to a given rider's size or taste. The ski operates at a preset flex within certain limits. Thus, a rider may still experience problems in bumps with darting as the ski may be too soft for a large rider and thus, flex to a point where the rear portion of the ski leaves the ground and reduces a rider's control of the sled.

From this discussion, it can be seen that it is desirable to supply a ski that works to absorb bumps during riding. It is also desirable to make this ski adjustable to riders of a given weight and different riding styles. Further, it is necessary that this ski be designed to flex evenly throughout its length so that the ski will not buckle under extreme bumps such as ditches, logs and rocks.

SUMMARY OF THE INVENTION

It is the primary objective of the present invention to provide a ski type steering mechanism for snowmobiles and other similar vehicles including small airplanes and BOMBARDIERS that are made up entirely of a single piece of Ultra High Molecular Weight Polyethylene (UHMW).

It is an additional objective of the present invention to provide such a "one piece ski" that has a flat lower surface that will tend to float on top of, rather than sinking into, snow cover regardless of whether the snow is in a packed or powder condition.

It is still a further objective of the present invention to provide such a "one piece ski" that has extending from the entire length of its lower surface a ninety degree which is used to provide steering and stabilizing impetus to the snowmobile to which it is attached.

These objectives are accomplished by the use of a flexible ski which is molded in one piece entirely of UHMW plastic. The adjustable flex ski is made up of a ski body which forms the majority of the invention and provides the base to which the other components are attached. This ski body is molded in a flat configuration. The front portion of this ski is given a pre-load function by bending the forward most portion of the ski body in an upward fashion. It is then held in this position by the use of pre-load bar which extends pivotally rearward from the tip of the ski to a ski saddle located on the upper center surface of the ski body. This saddle provides various attachment points for the pre-load bar and can thus, varies the amount of pre-load on the ski. The saddle is also supplied with an attachment point for mounting the ski on the vehicle. This configuration allows the tip of the adjustable flex ski to flex in an upwardly fashion when confronting obstacles which provides the operator with a greater degree of control in rough terrain.

Therefore, when the present invention encounters and impacts an obstacle, the energy created by this impact is absorbed by the flexible ski body in the pre-load area of the ski. Therefore, the impact absorbsion motion is confined to the movement of the components of the present invention and the ski body, which remains flat on the surface over which it is traveling. This ability to flex greatly enhances directional control over the prior art as the control surfaces intended to provide directional control remain in constant contact with the ground.

For a better understanding of the present invention reference should be made to the drawings and the description in which there are illustrated and described preferred embodiments of the present invention.

DESCRIPTION OF THE PREFERRED EMBODIMENT

Figure 1:
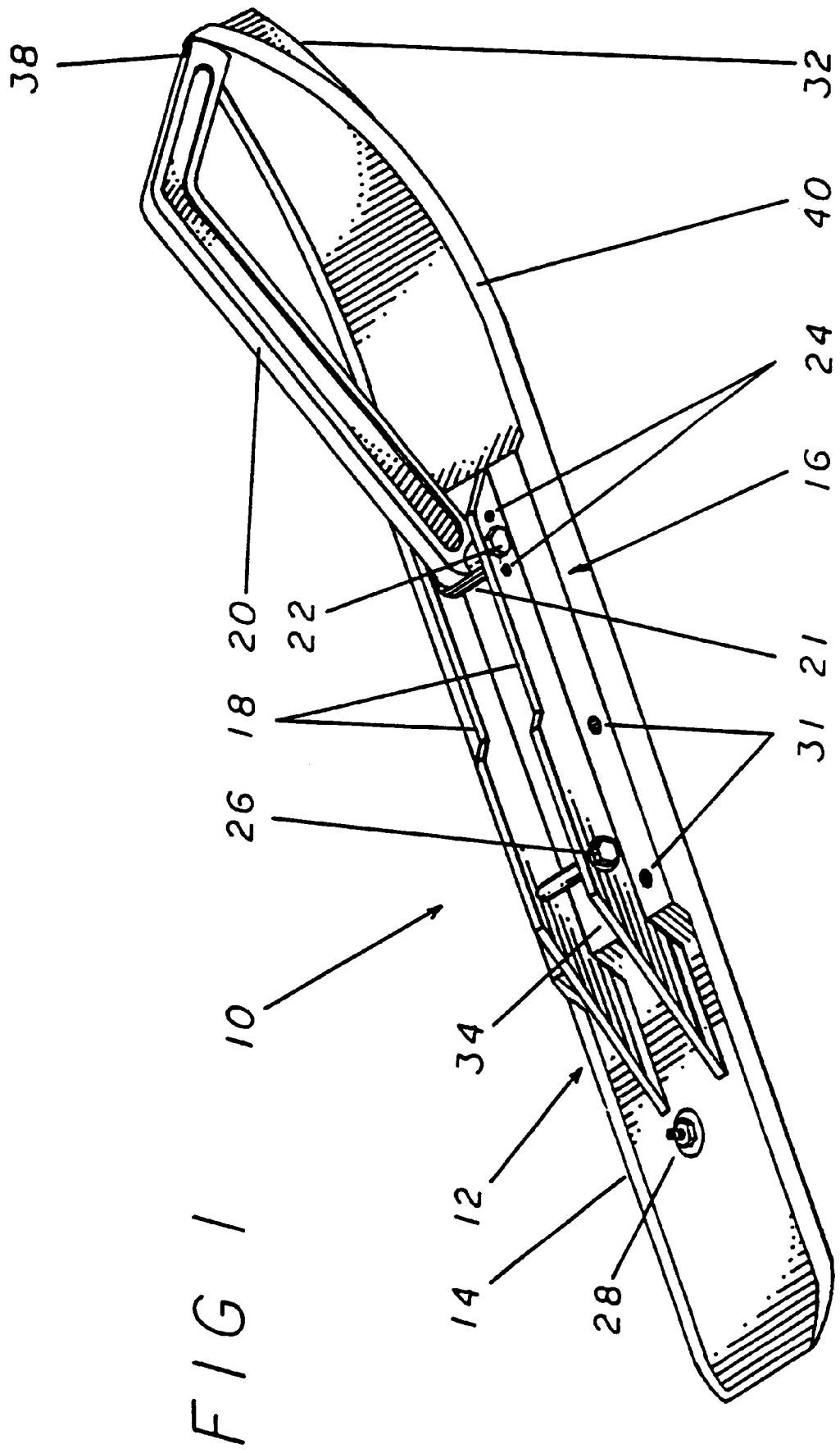
FIG. 1 is a perspective view of the present invention showing the manner in which its major components relate to one another to comprise the invention.
Figure 2:
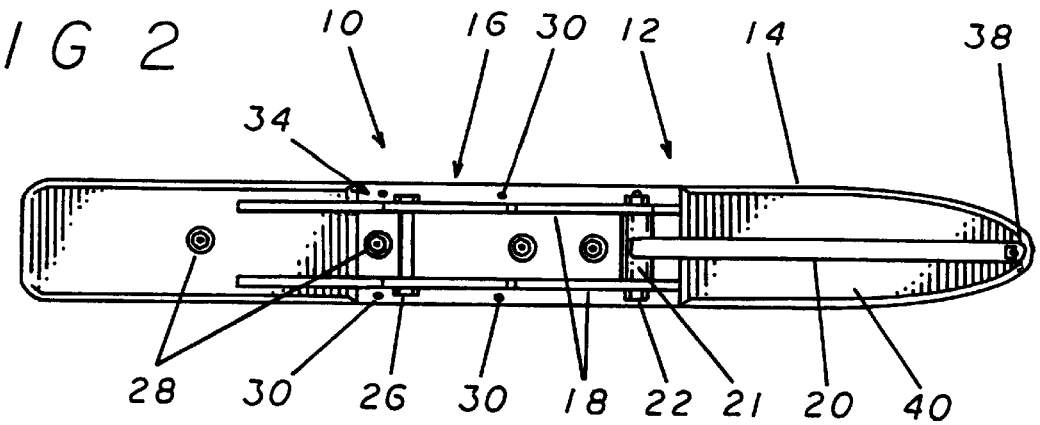
FIG. 2 is a top elevation view of the present invention showing the orientation of its major components in relation to the body of the ski.
Figure 3:
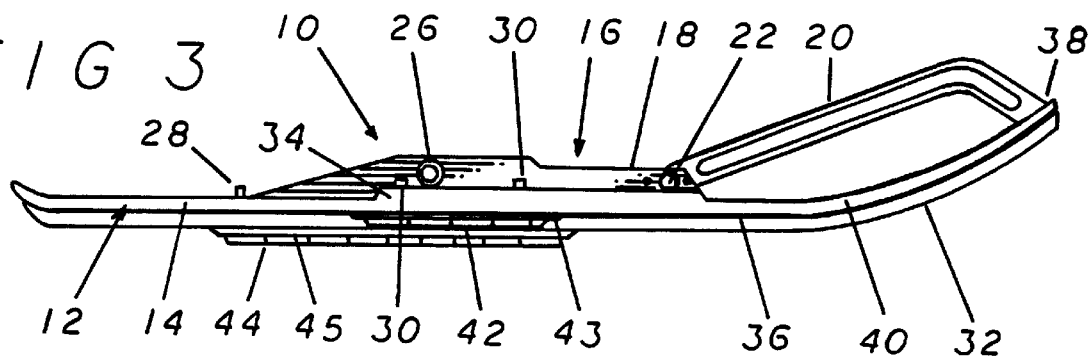
FIG. 3 is a side elevation view of the present invention showing the orientation of its major components in relation to the body of the ski.
Figure 4:
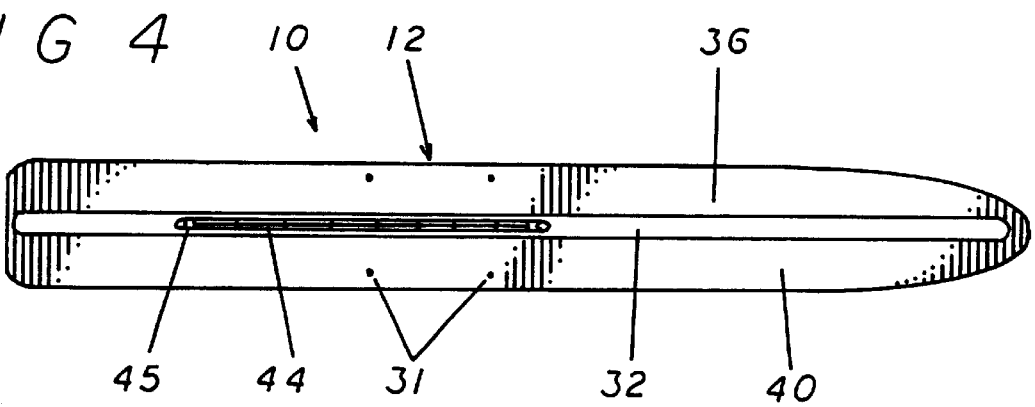
FIG. 4 is a bottom elevation view of the present invention showing the location of the 90 degree keel and the ski as configured only with the center carbide.

Referring now to the drawings, and more specifically to FIGS. 1, 2, 3 and 4, the one piece molded snowmobile ski 10 is made up of a ski body 12 which forms the majority of the invention and provides the base to which the other components are attached. The ski body 12 has ski edges 14 running laterally along the entire upper lengths and extending upwards which form a shallow depression in the center of the upper surface of the ski body 12. At the longitudinal center of the ski body 12, this depression is filled in and raised above the upper most surface of the ski edges 14 to form the saddle mounting platform 34. On the upper surface of the saddle mounting platform 34 two projections called the saddle vertical mount plates 18 extend upward and form the attachment point for the ski mount bolt 26 which facilitates the attachment of the present invention to a snowmobile.

The ski body 12, the saddle mounting platform 34, and the ski saddle 16 are all formed from one piece of UHMW plastic in a manner so that the natural state of the present invention is flat along the entire length in regards to the upper surface of the ski body 12. This one piece construction provides a lightweight ski that is extremely strong and that is less expensive to produce and sell than previous multiple piece snowmobile ski designs.

The pre-load function of the present invention is provided by bending the forward most portion of the ski body 12 at the pre-load zone 40, which narrows down to a point at its front tip as in a standard ski, in an upward fashion. It is then held in this position by the use of the pre-load bar 20 which extends forward from the front of the ski saddle 16 to the tip of the ski body 12. At is rearward end, the pre-load bar 20 is attached to the saddle vertical mount plates 18 of the ski saddle 16 by the use of the pre-load rear mount 21 which is a perpendicularly mounted cylindrical portion of the pre-load bar 20 having a hole formed longitudinally though its center. The forward most end of the pre-load bar 20 is attached to the front of the ski body 12 by the use of the pre-load bar front mount 38. The distance between the rear and front mounts, 21 and 38, of the pre-load bar 20 is shorter that the distance between the rear mount 21 and front mount 38 located at the tip of the ski body 12, thus, the attachment of the pre-load bar 20 forces the ski tip to be held in an upwardly curved position.

Figure 8:
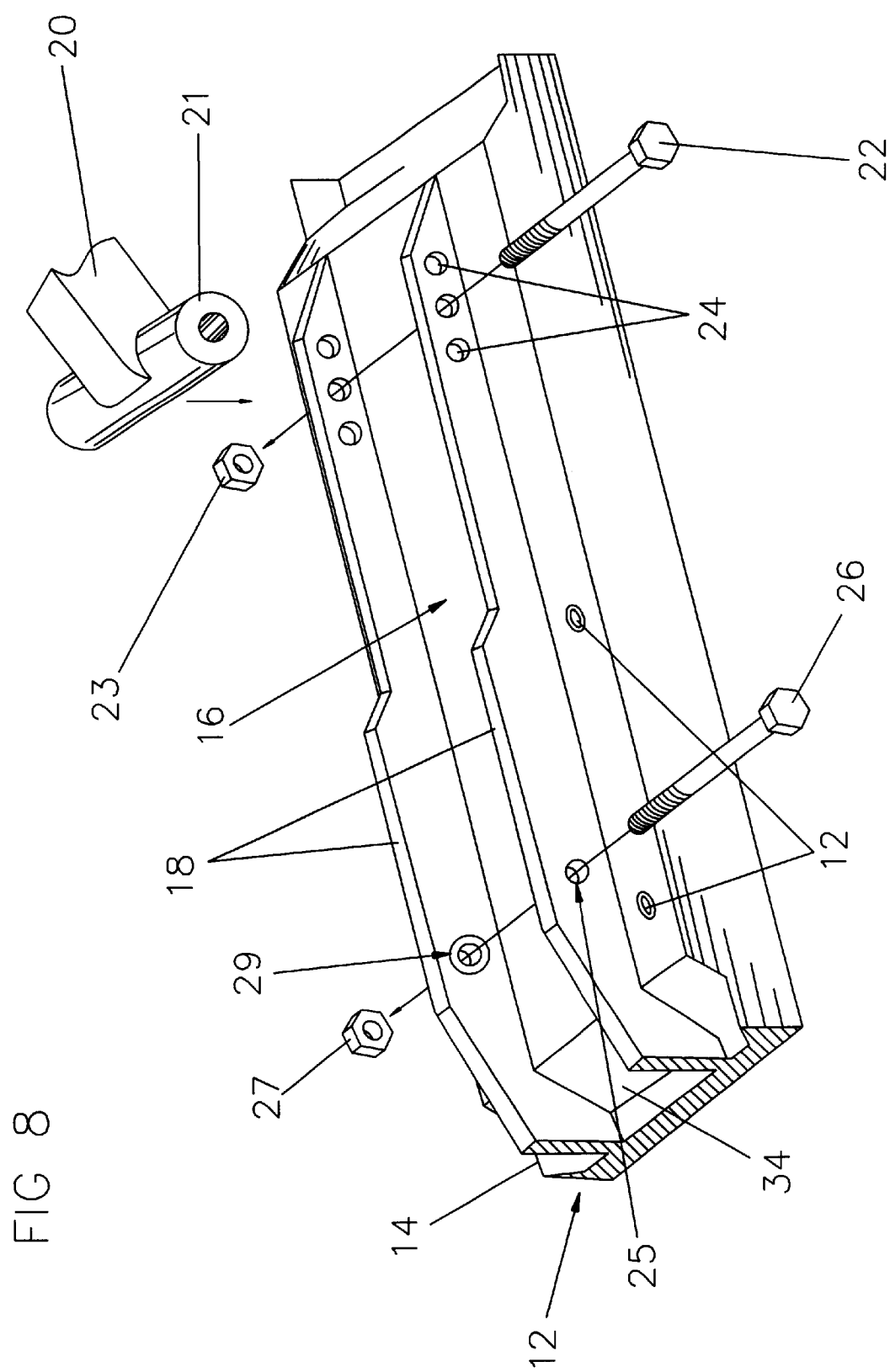
FIG. 8 is a perspective view of the saddle portion of the present invention showing the manner in which the ski attachment bolt and pre-load bar attach to the ski.

The variable pre-load bar mount holes 24 located on the front portion of the saddle vertical mount plates 18 provide a means of varying the amount of pre-load placed on the ski body 12 (the use of the variable pre-load bar mount holes 24 and the ski mount bolt 26 are illustrated in FIG. 8). The pre-load bar 20 is pivotally attached to the ski saddle 16 by passing the pre-load rear mount bolt 22 through one of the variable pre-load mount holes 24, through the pre-load rear mount 21 and out the opposite variable pre-load mount hole 24 where it is held in place by the use of the mount bolt nut 23. FIG. 8 also illustrates the manner in which the ski mount bolt 26 passes through the ski mount bolt holes 25, which contain the ski mount bolt bushings 29, located on the saddle vertical mount plates 18 to allow for the attachment of the present invention to snowmobile.

The amount of pre-load placed on the ski body 12 is accomplished by changing the distance between the pre-load bar rear mount 21 and the pre-load bar front mount 38 and, therefore, the amount of pre-load placed on the tip of the ski body 12. For example, if the pre-load bar rear mount 21 is mounted to the most forward of the variable pre-load mount holes 24, the amount of pre-load placed on the ski body 12 is relatively small, therefore, providing a softer ride that is the recommended setting for riders of lighter weights. Conversely, if the rear of the pre-load bar rear mount 21 is mounted to the most rearward of the variable pre-load mounting holes 24, the amount of pre-load placed on the ski body 12 is relatively large, therefore, providing a stiffer ride that is the recommended setting for riders of heavier weight.

These adjustments can also be made to compensate for varying types of conditions and for the type of riding to be done. Therefore, the present invention provides a means by which the handling characteristics of the skis can varied to improve the efficiency of the vehicle. This is especially important in racing where different tracks present a varying set of problems that can be overcome by simply adjusting the skis.

Figure 9:
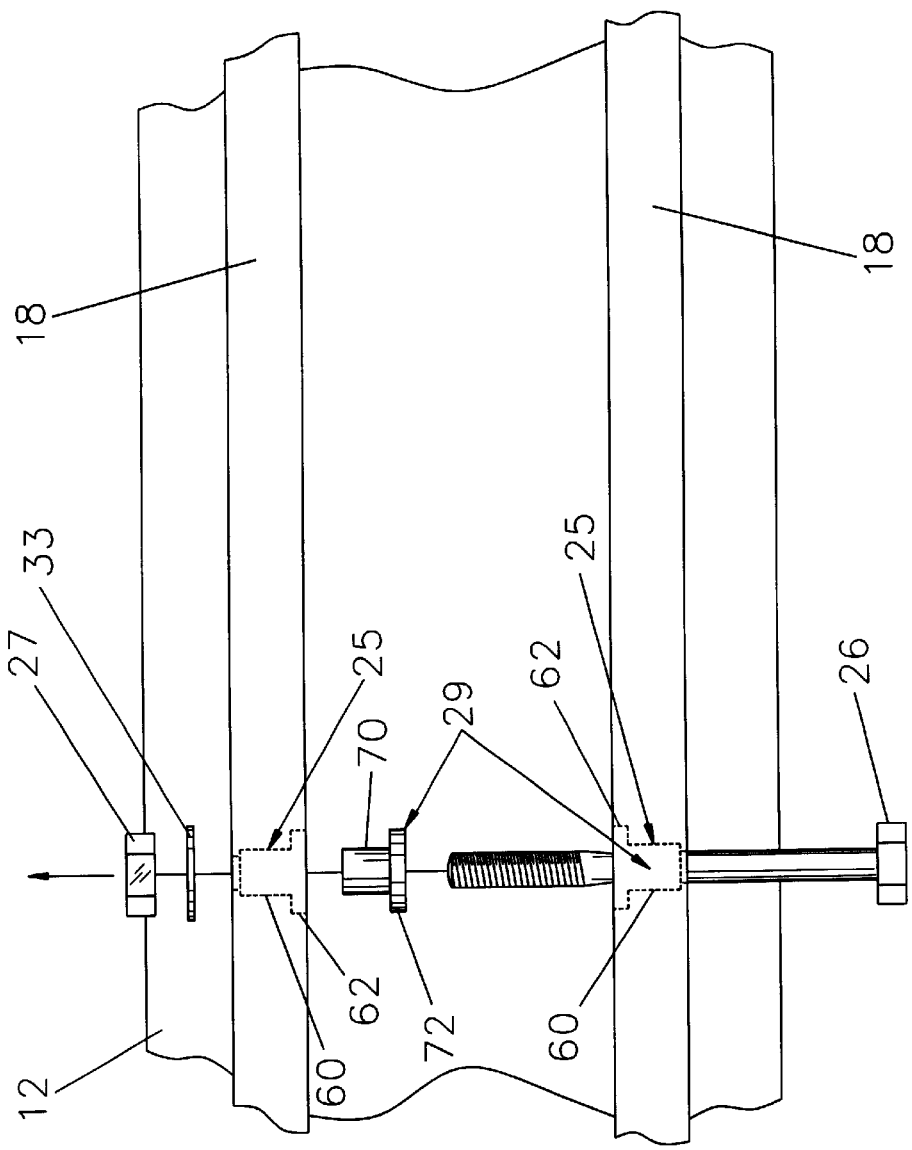
FIG. 9 is an exploded view of the ski saddle component of the present invention detailing the manner in which the ski mounting bolt attaches to the vertical portions of the "one piece ski."

The ski saddle 16 also provides the point, through the saddle vertical mount plates 18, at which the present invention is attached to the vehicle on which it is to be used. The mounting configuration is also detailed in FIG. 9. This is accomplished by placing the ski cradle of a typical snowmobile between the two parallel saddle vertical mount plates 18 of the ski saddle 16 and passing the ski mount bolt 26 through the ski mount bolt hole 25 (which contains the ski mount bolt bushing 29) one side of the ski saddle 16, through the ski cradle and out the other side of the ski saddle 16 where it is secured by the use of the ski mount nut 27 and washer 33. As best illustrated in FIG. 9 of the drawings, each ski mount bolt hole 25 preferably has a first portion 60 having a first diameter and a second portion 62 having a second diameter. The second diameter of the second portion 62 is preferably larger than the first diameter of the first portion 60 of the ski mount bolt hole 25. As further shown in FIG. 9 of the drawings, each ski mount bolt bushing 29 preferably has a first segment 70 and a second segment 72. The first segment 70 of the ski mount bolt bushing 29 corresponds to the first portion 60 of the ski mount bolt hole 25. The second segment 72 of the ski mount bolt bushing 29 corresponds to the second portion 62 of the ski mount bolt hole 25. The ski mount bolt holes 25 and the ski mount bolt bushings 29 may have various cross sectional shapes including but not limited to circular and rectangular. Since the method of attaching snowmobile skis needs to be universal, the ski mount bolt bushings 29 come in a variety in inside diameters which allows the present invention to be attached to and used in conjunction with any of the many makes of snowmobiles on the market today.

Figure 6:
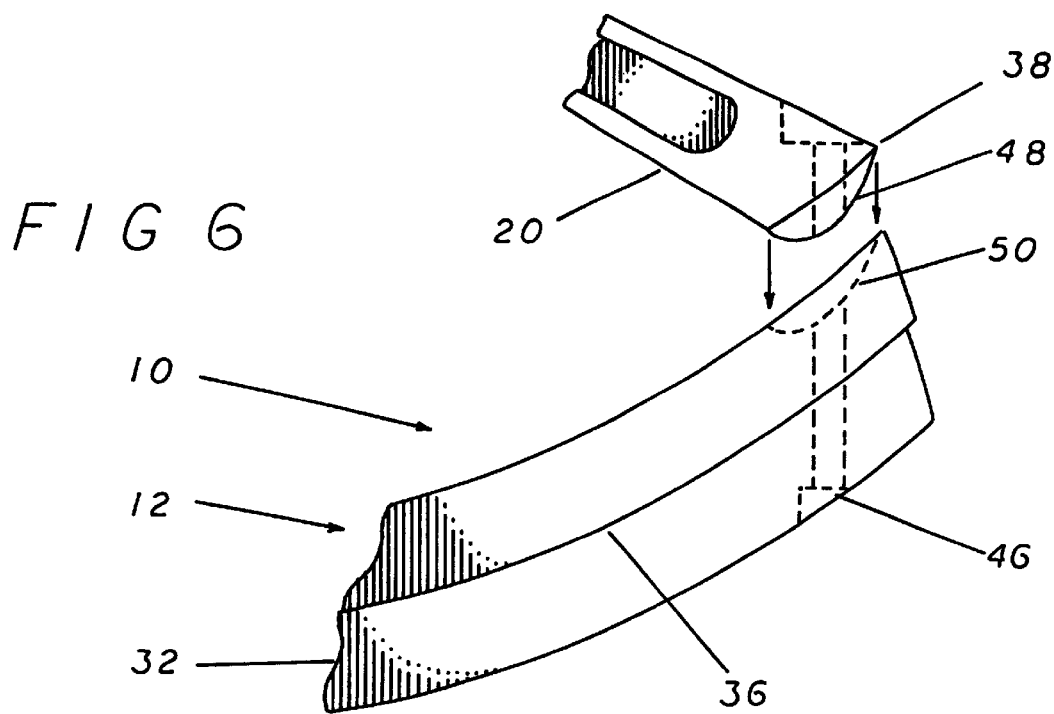
FIG. 6 is a side elevation exploded view of the front portion of the present invention showing the method of construction of the pre-load bar attachment socket.

The attachment of the pre-load bar 20 to the front tip of the ski body 12 is illustrated in FIG. 6. The most forward portion of the upper surface of the ski body 12 is equipped with a concave depression called the mount socket 50. The most forward lower surface of the pre-load bar 20 is equipped with a corresponding convex surface called the mount ball 48. These two surfaces fit together and a mounting bolt is passed through the pre-load bar front mount hole 46 which is bored through corresponding locations in both the pre-load bar 20 and the ski body 12 tip.

Figure 5:
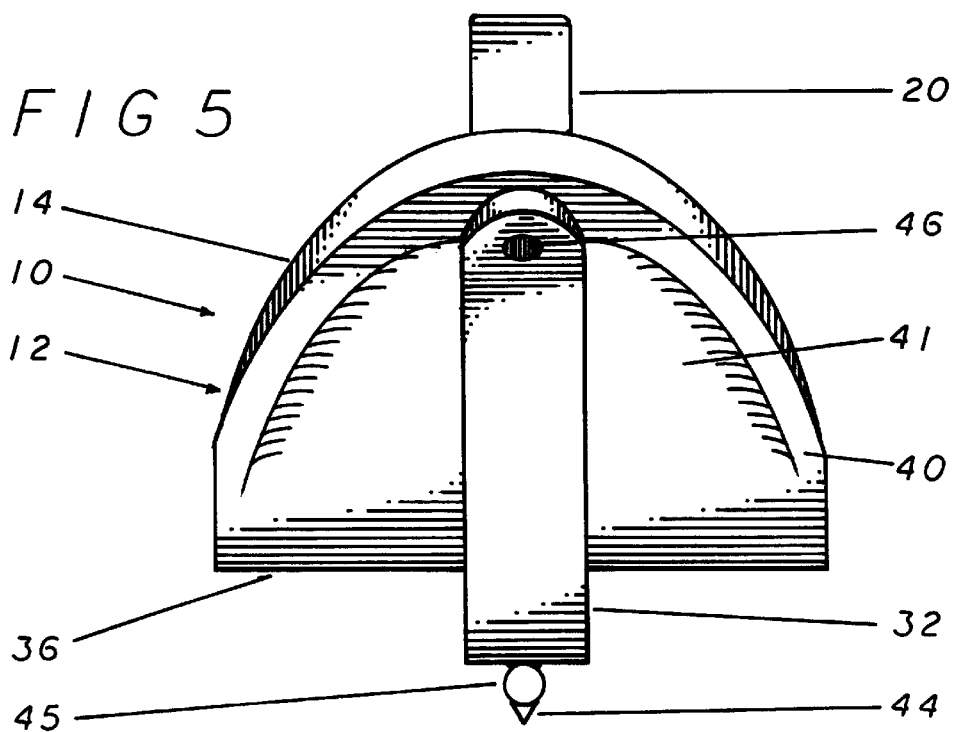
FIG. 5 is a front elevation view of the present invention showing the orientation of the 90 degree keel in relation to the body of the invention.
Figure 7:
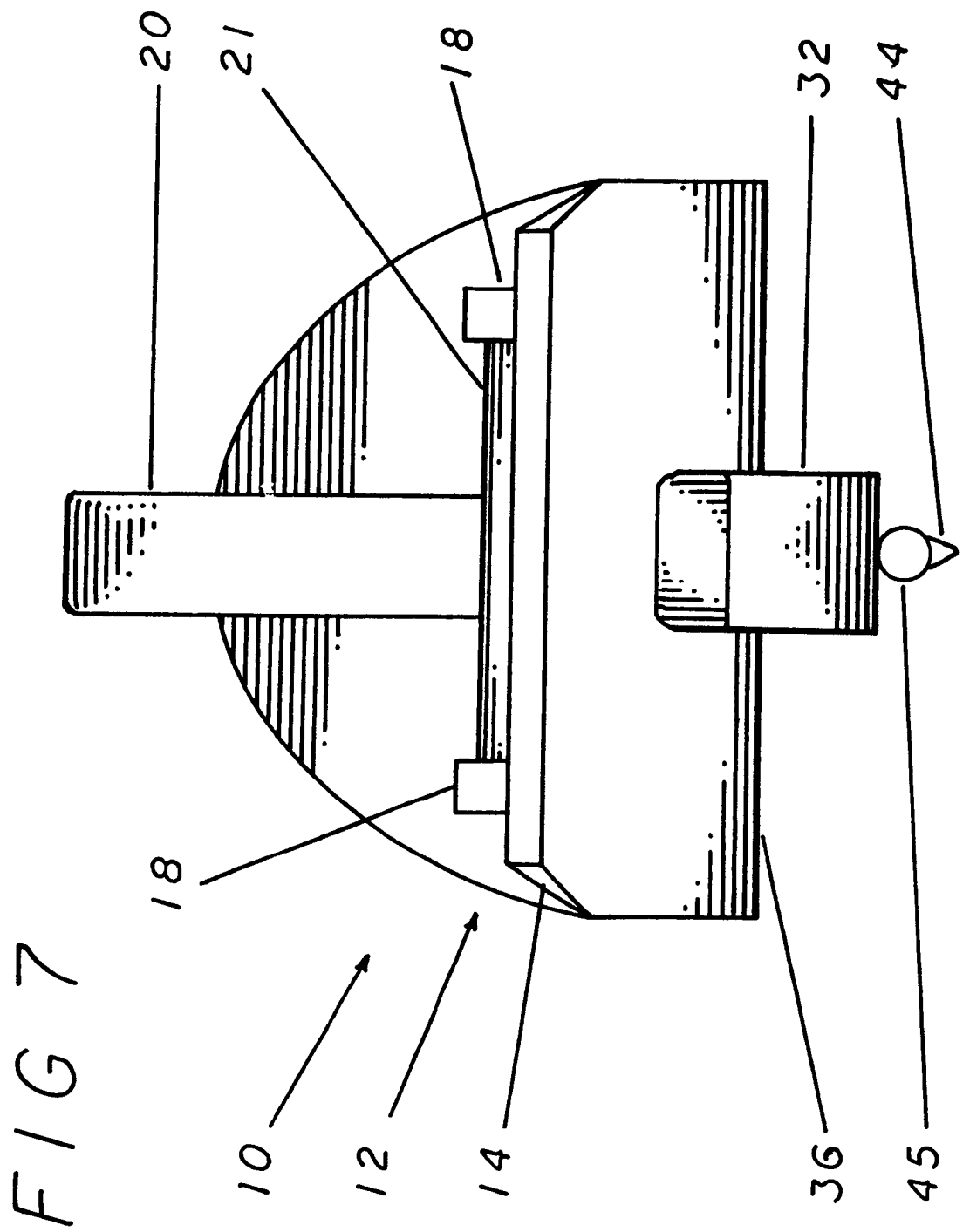
FIG. 7 is a rear elevation view of the present invention showing the orientation of the 90 degree keel in relation to the body of the invention.

The flat ski bottom 36 and the ninety degree keel features 32 of the present invention are illustrated in FIGS. 5 and 7. Both of these features run along the entire length of the ski body 12 and serve to provide the present invention with the floating action that is central to the invention. Additionally, FIG. 5 details how the pre-loading of the ski body 12 at the pre-load zone 40 creates a pre-load depression radius 41 at the front end of the ski body 12. The depression radius 41 is a result of the design of the ski body 12 in which the upper edges of the body 12 are thicker than the center. As the ski body 12 is bent upward during pre-load, the center tends to bow slightly upward, in relation to the outside edges, which forms the depression radius 41. This funnels snow over the 90 degree keel as the ski body 12 moves over the snow which aids in the present invention's tracking ability.

The general line of thinking in the design of the prior art was to build a snowmobile ski with a contoured bottom, much like the V-hull commonly employed in the design of boats. This design of ski tended to sink into the snow and it was this that provided much of the steering mechanism for the snowmobile. The flat ski bottom 36 of the present invention floats on top of the snow which creates less drag and therefore, allows the snowmobile to operate at a higher degree of efficiency.

The tracking and steering impetus for the snowmobile is provided by the ninety degree keel 32 which, as previously stated, runs along the entire length of the flat ski bottom 36 of the ski body 12. The ninety degree keel 32 is an approximately a one inch square portion of the one piece snowmobile ski 10 that extends downward from the flat ski bottom 36 along its center line. When the ski body 12 is in contact with the surface of snow, the ninety degree keel 32 sinks down into the snow. Therefore, as the ski is turned by the operator, the ninety degree keel bites into the snow and directs the direction of travel of the one piece ski 10 and the snowmobile.

Another feature of the present invention employed to enhance its steering and tracking characteristics is the use of carbide tipped runners mounted on the flat bottom 36 surface of the ski body 12 and the lower surface of the ninety degree keel 32. The location, method of attachment and orientation of these runners is illustrated in FIGS. 3, 4, 5 and 7. Typically, the present invention would be fitted with either one or three sets of these carbide runners. The largest of these is the center carbide 44 which extends for about half of the length of the ski body and is mounted to the bottom surface of the ninety degree keel 32. The center carbide 44 is made up of a small triangular strip of extremely hard carbide steel which is permanently attached to the bottom surface of the center carbide mount 45 which is in turn attached to the ski body 12 by the use of a plurality of attached center carbide mounting bolts 28 which extend upwards through the ski body 12 where they are held in place with series of nuts and washers.

The side carbides 42 and side carbide mounts 43 are similarly configured but are considerably shorter, about half that of the center carbides 44, in length. Additionally, they are attached to the ski body 12 in much the same way as the center carbide 44 as the side carbides 42 also have mounting bolts 30 which extend up through the ski body 12 through the mount holes 31 and are held in place with a series of nuts and washers. Again, this is a very flexible design feature of the present invention as it provides a means by which the carbides can be quickly removed or installed to compensate for varying conditions encountered by the user. It also enables a person to comply with the rules of certain racing sanctioning bodies as many of these do not allow the use of one or more of these carbides.

Figure 10:
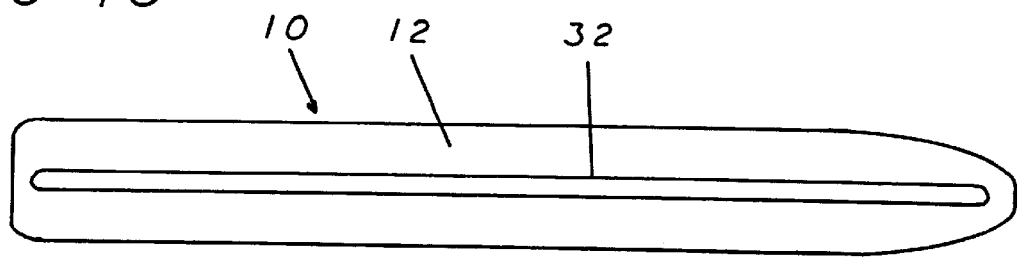
FIG. 10 is a bottom elevation view of the present invention showing it as configured with a narrow ski body which does not employ the use of the directional control veins in its lower surface.
Figure 11:
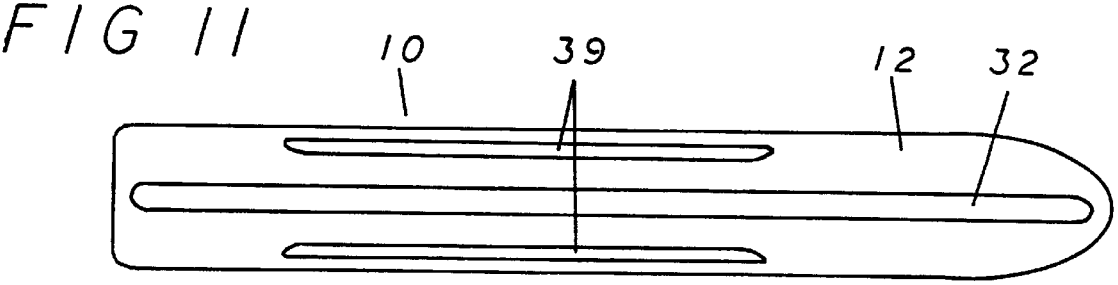
FIG. 11 is a bottom elevation view of the present invention showing it as configured with a wide ski body which does allow for the use of a pair of directional control veins located in its lower surface.
Figure 12:
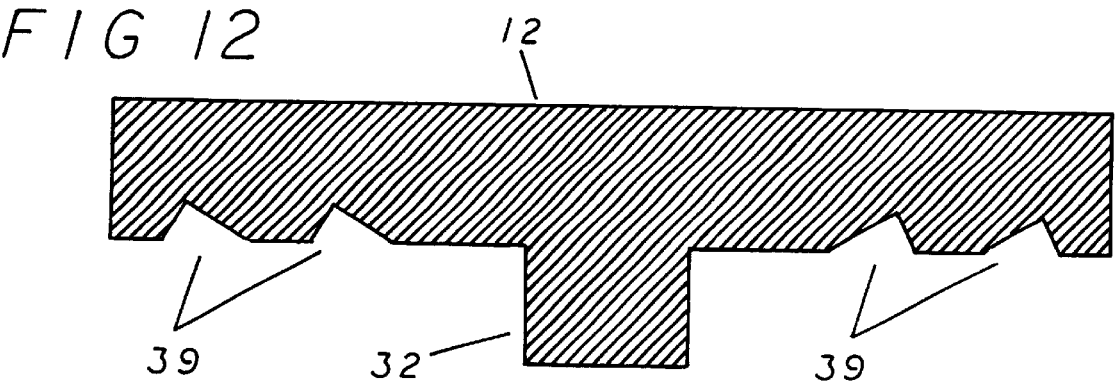
FIG. 12 is a front elevation cut-away view of the present invention showing it as configured with an extra wide ski body allowing for the use of two pairs of directional control veins located in its lower surface.

FIGS. 10, 11 and 12 illustrate the variety of widths that the ski body 12 of the present invention comes in and the use of the optional directional control veins 39. FIG. 10 shows a narrow ski body 12 in a width of approximately five inches which may be too narrow to allow for the use of the directional control veins but still allows for the use of side carbides 43 when conditions and regulations allow for it. FIG. 11 shows the ski body 12 in a wider width which allows for the use of a pair of control veins 39 (angled depressions in the lower surface of the ski body 12) which aid in directional impetus for the present invention.

FIG. 12 illustrates the ski body 12 in a still wider width which allows for the use of two pairs of the control veins 39. This figure also further details the configuration and manner of construction of the control veins 39. The outer edges of these control veins 39 are cut at an inward angle although the vein itself is typically a right angle section. It has been found that the inward angle seems to work best to form 10 degrees to 25 degrees. The purpose of this angle is that when the skis of a snowmobile are turned to effectuate a turn, they tend to rotate slightly in the horizontal plane in the direction of the turn. Thus, when the skies are fully turned the angle of the outer edge of the control veins 39 forms a ninety degree angle in relation to the surface of the snow which adds a greater degree of control to the turning snowmobile.

Although the present invention has been described in considerable detail with reference to certain preferred versions thereof, other versions are possible. It should also be stated at this point that although this invention is described in the context of a snowmobile, this invention would be equally useful on airplane skis, BOMBARDIERS, SNO-SCOOTS, and other similar vehicles. Therefore, the spirit and scope of the appended claims should not be limited to the description of the preferred versions contained herein.

What is claimed is:

1. A one piece base, adjustable flex ski for use on a vehicle, said ski comprising:

a molded one piece flexible elongate ski having an upper surface, said first portion and said second portion are spaced apart from each other a bottom surface, and a first portion and a second portion extending upwardly from said upper surface;

a first aperture and opposite said first aperture within said first portion;

a second aperture within said second portion concentric with said first aperture;

a first bushing member positioned within said first aperture;

a second bushing member position within said second aperture, wherein said bushing members receive a pin member, wherein a mount nut is secured to an end of said pin member for securing said ski to said vehicle; and wherein said first aperture and said second aperture each have a first portion having a first diameter and a second portion having a second diameter wherein said second diameter is larger than said first diameter, and wherein said first bushing member and said second bushing member each have a first segment corresponding to said first portion and a second segment corresponding to said second portion of said apertures, wherein a mount not is secured to an end of said pin member.

2. The one piece base ski of claim 1, wherein said first aperture and said second aperture have a circular shape, and wherein said first bushing member and said second bushing member have an outer circular shape corresponding to said apertures.

3. The one piece base ski of claim 1, wherein said first aperture and said second aperture have a rectangular shape, and wherein said first bushing member and said second bushing member have an outer rectangular shape corresponding to said apertures.

\* \* \* \* \*

UNITED STATES PATENT AND TRADEMARK OFFICE
CERTIFICATE OF CORRECTION

PATENT NO.   : 6,331,008 B1
DATED        : December 18, 2001
INVENTOR(S)  : Dale DeWayne Cormican It is certified that error appears in the above-identified patent and that said Letters Patent is hereby corrected as shown below:

Claim 1,
Lines 4-5, please delete "said first portion and said second portion are spaced apart from each other".
Line 7, after "from said upper surface" please insert -- , said first portion and said second portion are spaced apart from each other --.
Line 8, please delete "and opposite said first aperture".
Line 11, after "with said first aperture" please insert -- and opposite said first aperture --.
Lines 26-27, after "of said apertures," please delete "wherein a mount not is secured to an end of said pin member".
Line 26, after "of said apertures," please insert -- wherein said second segment of said first bushing member is opposite said second segment of said second bushing member --

Signed and Sealed this

Fifth Day of March, 2002

*Attest:*

JAMES E. ROGAN
*Attesting Officer*   *Director of the United States Patent and Trademark Office*